(12) United States Patent
Hergeth (10) Patent No.: US 8,302,975 B2
(45) Date of Patent: Nov. 6, 2012

(54) TRANSPORT SYSTEM, IN PARTICULAR HAVING MOVABLE PALLETS

(76) Inventor: Willibald Hergeth, Berching (DE)

( * ) Notice: Subject to any disclaimer, the term of this patent is extended or adjusted under 35 U.S.C. 154(b) by 0 days.

(21) Appl. No.: 12/733,719

(22) PCT Filed: Sep. 21, 2008

(86) PCT No.: PCT/DE2008/001560
§ 371 (c)(1),
(2), (4) Date: Dec. 14, 2010

(87) PCT Pub. No.: WO2009/036750
PCT Pub. Date: Mar. 26, 2009

(65) Prior Publication Data
US 2011/0084459 A1    Apr. 14, 2011

(30) Foreign Application Priority Data

Sep. 21, 2007    (DE) .................. 10 2007 045 404
Jul. 31, 2008    (DE) .................. 10 2008 035 914

(51) Int. Cl.
*B62B 3/00*    (2006.01)
(52) U.S. Cl. ................ 280/47.19; 280/79.11; 414/788.3
(58) Field of Classification Search ............... 280/47.35, 280/79.11, 79.03, 33.998, 408, 411, 412, 280/33.91, 47.24, 47.19; 414/788.3; 296/3
See application file for complete search history.

(56) References Cited

U.S. PATENT DOCUMENTS 5,904,384 A * 5/1999 Mader et al. ............... 292/333
6,866,463 B2 * 3/2005 Riordan et al. ............. 414/498

FOREIGN PATENT DOCUMENTS

| DE | 1 943 854 | 3/1971 |
| DE | 203 09 653 U1 | 10/2003 |
| DE | 20 2004 001 688 U1 | 5/2004 |
| DE | 20 2006 005137 U1 | 5/2006 |
| EP | 1 352 815 | 10/2003 |
| EP | 1 743 828 A | 1/2007 |
| FR | 2 631 948 | 12/1989 |
| FR | 2 879 951 | 6/2006 |
| WO | WO 98/58849 | 12/1998 |
| WO | WO 2006/061150 | 6/2006 |

* cited by examiner

*Primary Examiner* — J. Allen Shriver, II
*Assistant Examiner* — James Triggs
(74) *Attorney, Agent, or Firm* — Davidson, Davidson & Kappel, LLC (57) ABSTRACT

The present invention relates to a transport system (1) comprising a trolley (5) and a goods carrier (100), which can be detachably connected to each other via a coupling (65, 154). A remarkable characteristic of the transport system (1) is a platform (11), which extends over all parts (5, 100) of the transport system (1) and coincides with a platform (13) of the trolley (5) so that as a result both a delimiting connecting member (15) is provided between individual parts (67, 69) of the trolley (5) and also individual goods can be disposed on the goods carrier (100).

15 Claims, 12 Drawing Sheets

TRANSPORT SYSTEM, IN PARTICULAR HAVING MOVABLE PALLETS

The present invention relates to a transport system having a trolley and a goods carrier, which are detachably connectable to one another via a coupling. A trolley is understood here to be a transport aid provided with rollers.

BACKGROUND

Pallets have become very important in transport logistics to allow the handling of goods as rapidly and efficiently as possible. To accelerate this procedure, it is known from WO 98/58849 and also from GB 960 768 to provide the bottom of the pallet with wheels via which the pallet may be moved with or without loaded goods. To allow automated conveyance of the pallet, the wheels may be retracted in the case of a pallet according to WO 98/58849. For fixation of the wheels in one position, a lock is provided which must be removed to then be able to retract or extend the wheels. If the pallet is to be secured to prevent unintended movement, the wheels must first be unlocked, then retracted and finally locked again in a complicated procedure. The individual pallets may be joined together by couplings to form a pallet train and transported away simultaneously in a row one after the other if the wheels are unlocked.

DE 1 943 854 A describes a similar train-type transport frame for carrying pallets, which are placed on supports of an individual transport cart in the corners of the transport frame so that they are lifted as high as possible from the floor and project above the transport cart and may be removed automatically.

SUMMARY OF THE INVENTION

A disadvantage of the approaches known from the related art is that many designs of transport devices for pallets are susceptible to accidents and defects or the procedure and handling are complex. Both situations delay the prompt handling of goods and products placed on the pallets.

An object of the present invention is to provide a generic transfer-capable transport system which will meet with high acceptance among users. This acceptance should be attributable to easy and reliable handling of the pallets and of the transport system. The risk of accidents for warehouse employees when loading and transferring the goods to be transported should be as low as possible.

In the case of the transport system according to the present invention, a trolley which may be equipped with at least one goods carrier is provided. The trolley and goods carrier are each provided with wheels, so that they are movable independently of one another, but are also jointly movable in the coupled state as a transport system. The wheels of the trolley and goods carrier are each situated in a separate chassis. The chassis transfers the loads of the transport system and the loaded goods, if applicable, onto the wheels. Front and rear chassis parts are connected via a trolley frame, so that the goods carrier may be inserted between the front and rear chassis parts on both sides. The trolley frame creates the clearance between the front and rear chassis parts for accommodating a plurality of goods carriers or one goods carrier.

A platform extending over all the parts of the transport system and coinciding with a platform of the trolley is provided in the transport system. The platform has a stabilizing effect on the center of gravity of the goods transport system. Based on the platform, there is a bordering connecting member between individual parts of the trolley. The platform is also intended to accommodate a single good or multiple goods present on the goods carrier. The term platform refers in general to a plane, but it may have a certain offset between the individual parts.

With respect to its shape and structure, the trolley is reminiscent of the shape of a baggage cart such as that used by a hotel bellboy for room luggage service and its silhouette may also be compared to a cart known as a hotel cart. Other conventional terms for the Germanized word include outside cart, transport cart, frame cart, chassis, train cart, etc., some of these terms emphasizing a single functional aspect of the trolley to a greater extent.

One particular advantage of the present invention is that the goods carrier, which may be designed as a pallet having wheels, for example, is loadable without a surrounding chassis. As soon as the load, such as goods or other products, is stowed on the goods carrier, the goods carrier may be quickly inserted laterally at any available place on the passing train, which may include a plurality of train carts, locked, and thus secured reliably.

The universality of the goods carrier is another advantage. The goods carrier is a platform for transport containers and transport items such as mesh boxes to be placed thereon, containers to be bolted in place, or standard pallets. Such standard pallets also include DB Euro pallets, for example.

The goods carrier is preferably equipped with a tension rod with which the goods carrier is conveniently movable by hand. It is designed to be pivotable between a resting position and a working position and may thus be stowed in the resting position. The tension rod is preferably able to be stowed within the horizontal projection of the goods carrier, so that it does not constitute an obstacle.

According to one aspect of the present invention, it may also be summarized very efficiently by the term "cart in a cart." The trolley, the outer chassis, represents the first exterior cart, and the goods carrier represents the second interior cart which is surrounded by the exterior cart.

Locking takes place automatically when the coupling position is assumed. It is thus no longer possible for a negligent warehouse worker to simply forget about secure coupling.

Other advantages may be derived from the drawings and the claims.

BRIEF DESCRIPTION OF THE DRAWINGS

The present invention is more easily understandable if reference is made to the accompanying drawings.

DETAILED DESCRIPTION

FIGS. 1 through 17 show an exemplary embodiment of a transport system according to the present invention from various views and perspectives in an overall view and with special individual parts shown separately. Reference is made to the accompanying list of reference numerals for the explanation of terms.

FIGS. 1 through 4 show trolley 5, which forms exterior cart 9 without interior cart 104, which is to be inserted and forms goods carrier 100. FIGS. 5 through 8 show the basic form of goods carrier 100 to which standard transport containers may be bolted, in particular via support boards 108, 110. Screw openings, which may also be used as rivet openings, are also shown in the respective edge areas of the support boards for this purpose.

Figure 1:
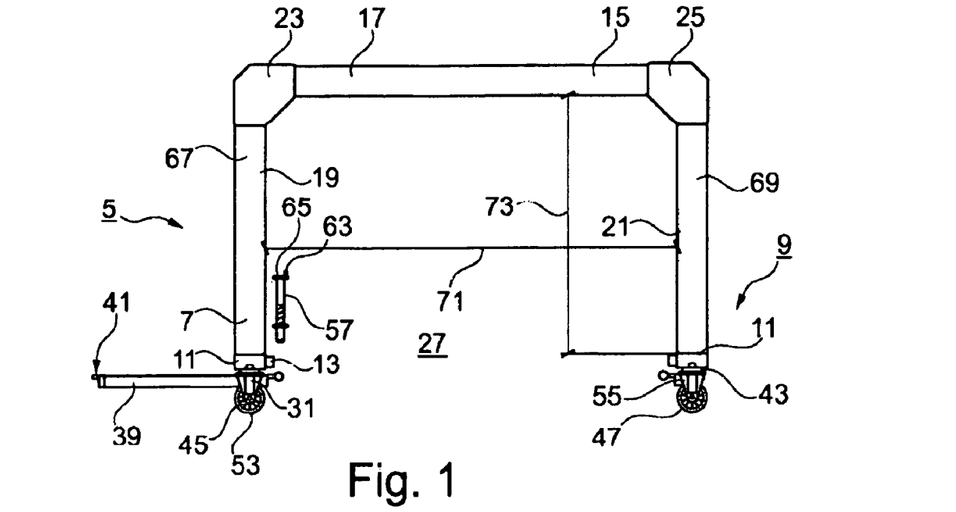
FIG. 1 shows a side view of a trolley.

FIG. 1 shows a side view of trolley 5, which includes essentially a chassis 7 and forms exterior cart 9 of the transport system. The side view, from which it is possible to see frontally toward first lateral insertion opening 27, which is situated on the left in the direction of travel, is selected here. Trolley 5 has a front part 67 and a rear part 69, which are connected by a trolley frame 15 pointing downward, i.e., in the direction of the floor, when inverted. Trolley frame 15 includes a first column 19 for front part 67 of trolley 5, a second column 21 for rear part 69, and a longitudinal trolley strut 17. In the lower part, the trolley forms a platform 11 (as represented by two reference numerals, extending from the front part to the rear part), in particular through transverse struts beneath trolley frame 15, which coincide almost identically with trolley platform 13. Trolley frame 15 essentially has a square design, a first longitudinal strut guide 23 and a second longitudinal strut guide 25 representing the transition between columns 19, 21 and longitudinal trolley strut 17. Longitudinal strut guides 23, 25 are designed in such a way that trolley 5 is telescopable with respect to its distance 71 between front part 67 and rear part 69.

In addition, longitudinal strut guides 23, 25 are designed in such a way that trolley frame 15 may be adjusted with a variable trolley frame height 73. Beneath trolley platform 13, trolley hitch 31, which includes trolley coupling rod 39 having coupling rod eye 41, is situated on the front side. Trolley frame 15 maintains its floor contact via trolley wheels 45, 47 as well as trolley wheels 49 and 51 (not shown in FIG. 1). Trolley wheels 45, 47 are inserted in double-plate roller mounts 55. Rollers 53, in particular solid rubber rollers, have proven suitable for in-plant goods transport. One trolley 5 may be combined with another trolley (not shown) via the trailer hitch, made up of trailer hitch trapezoidal plate 43 and trolley coupling rod 39, to form a train system. A locking bolt 57, which is a part 65 of the locking mechanism and is manually operable via a lift pin 63, is provided on the interior side of trolley frame 15.

Figure 2:
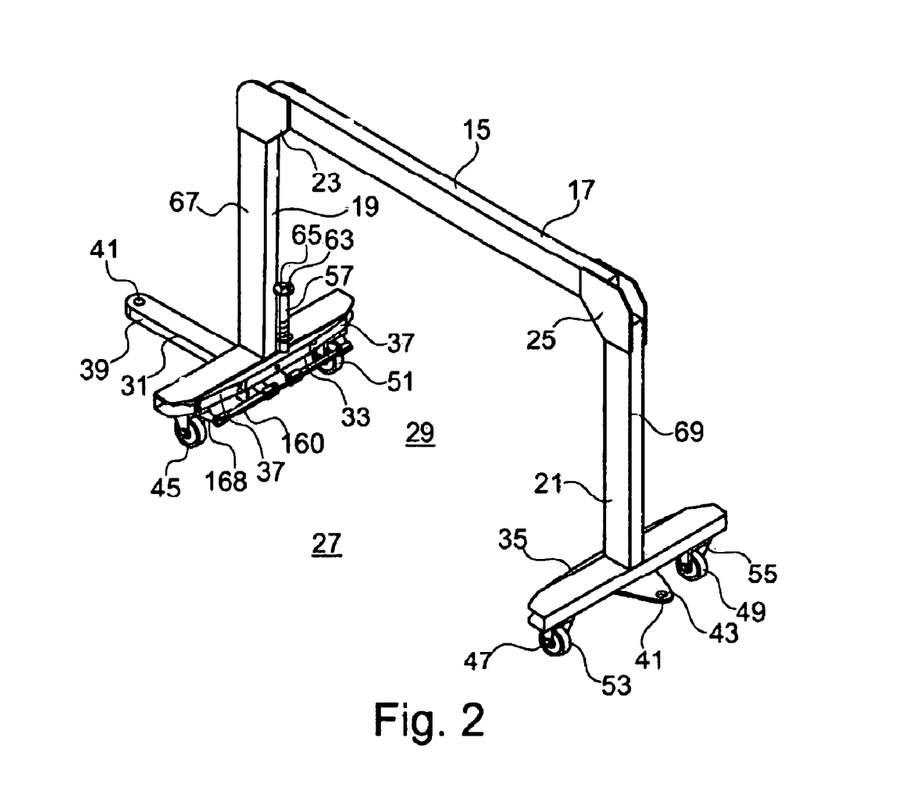
FIG. 2 shows a perspective view of a trolley.
Figure 4:
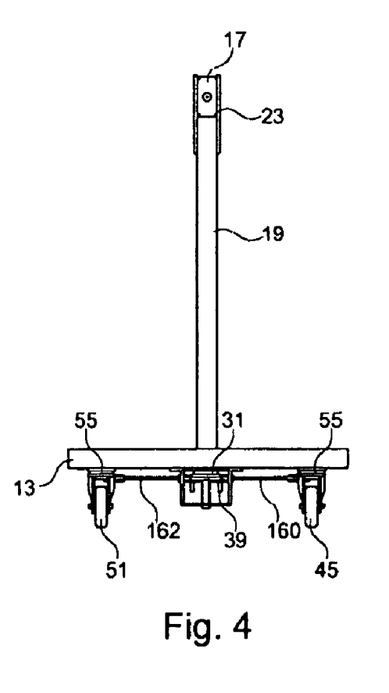
FIG. 4 shows a front view of a trolley.
Figures 5, 6:
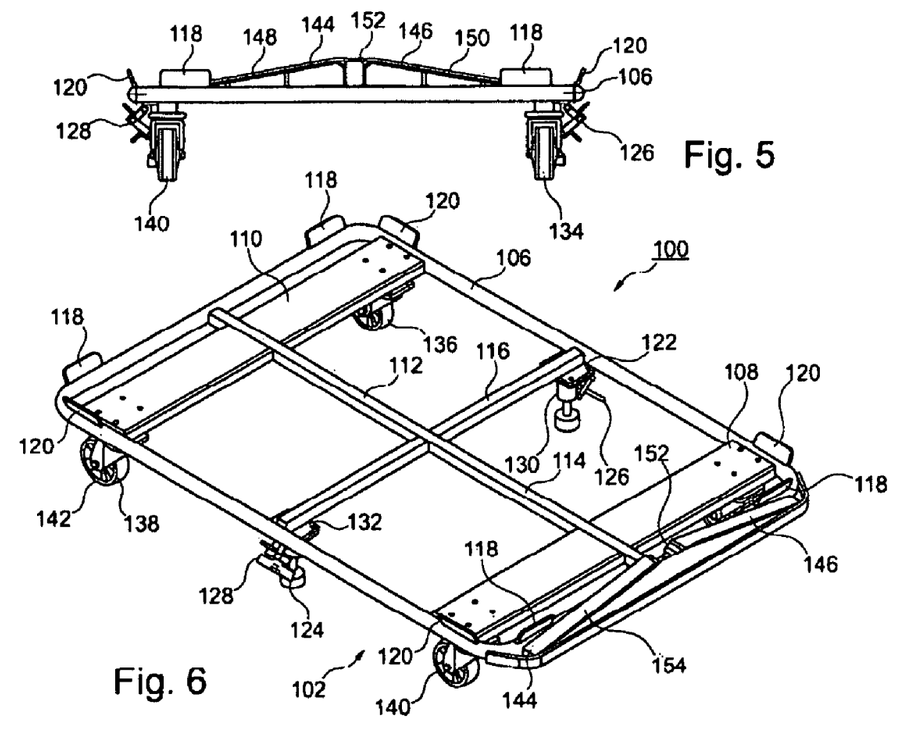
FIGS. 5 through 8 show a goods carrier from various views such as a top view, a perspective view, or a front view.
Figure 7:
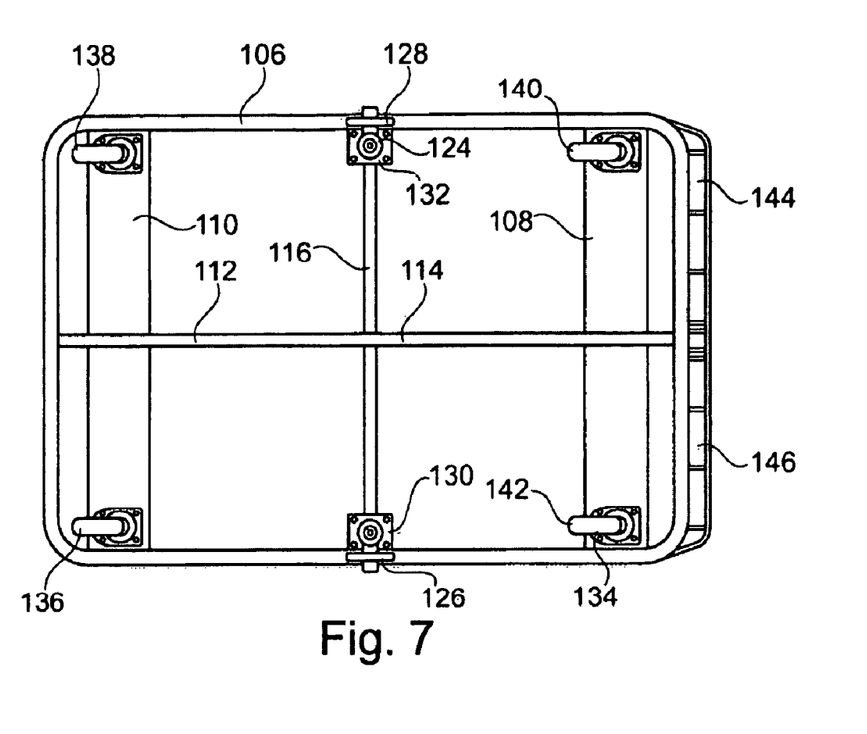

FIG. 2 shows a perspective view of trolley 5 from FIG. 1 in an uncoupled position II, so that first lateral insertion opening 27 and second lateral insertion opening 29 are visible. In the perspective diagram of FIG. 2, it is more clearly apparent that trolley frame 15 and its two longitudinal strut guides 23, 25 are formed essentially from three parts, namely a longitudinal trolley strut 17, a first column 19, and a second column 21. First column 19 together with additional parts forms front part 67, while second column 21 together with additional parts forms rear part 69 of trolley 5. Situated beneath columns 19, 21 are transversely running struts having additional add-on parts and forming general platform 13 of trolley 5 (as shown in FIGS. 1 and 4). Trolley wheels 45, 47, 49, 51 are mounted at the corners of the transverse struts. Double-plate roller mounts 55 are used for mounting trolley wheels 45, 47, 49, 51. Front trolley hitch 31 includes a trolley coupling rod 39 having a coupling rod eye 41, the dimensions of which are adapted to a second coupling rod eye 41 in a trailer hitch trapezoidal plate 43. A locking bolt 57 is provided on the interior side of trolley frame 15 at the lower end of trolley frame 15. Locking bolt 57 forms a part of locking mechanism 65 and has a lift pin 63 at its upper end. On the same side, namely the interior side, holding springs 160 are attached by spring retainer 168 to transversely running trolley parts, which form a platform. Goods carrier guides 33, which allow lateral insertion through insertion openings 27, 29 via goods carrier insertion brackets 37, are provided above this. Goods carrier guides 33, 35 for guiding goods carrier 100 (not shown in FIG. 2) are connected on each interior side of the lower end of trolley frame 15. Trolley wheels 45, 47, 49, 51 may be implemented as solid rubber rollers 53.

Figure 3:
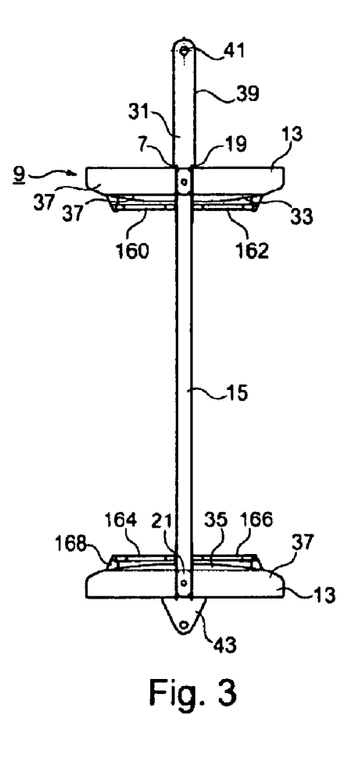
FIG. 3 shows a top view of a trolley.

As also shown in FIGS. 1 and 2, a front wheel pair and a tracking rear wheel pair having trolley wheels 45, 47, 49, 51 each form a trolley chassis. Trolley wheels 45 and 47 are coupled to hitch 31 via a tie bar 160 and 162, in such a way that when pivoting hitch 31, e.g., for turning, a corresponding steering angle of trolley wheels 45 and 47 is set. Depending on the specific embodiment of the trolley chassis, trolley wheels 49 and 51 of the tracking rear wheel pair may be freely rotating in the steering angle, rigidly linked together, or linked by tie bars 164 and 166. FIG. 3 illustrates an embodiment in which the trolley chassis has wheel pairs coupled together via tie bars 160, 162, 164 and 168.

FIG. 3 shows a top view of trolley 5 from FIG. 1, so that the trolley, which functions as exterior cart 9, forms the silhouette of exterior cart 9 mainly through its chassis 7, its trolley hitch 31 and its trailer hitch trapezoidal plate 43. In a top view, trolley frame 15 is primarily visible as first column 19 and second column 21 connected via the longitudinal strut. While the exterior sides of parts 13 forming the trolley platform are almost rectangular, the interior sides are designed via goods carrier insertion brackets 37 of goods carrier guides 33, 35 for easier and more reliable insertion of goods carrier 100 (not shown).

Trolley hitch 31 opens into trolley coupling rod 39, at the upper end of which is situated a coupling rod eye 41 suitable for coupling multiple exterior carts 9 to form a train.

The front view of the trolley illustrated in FIG. 4 shows two trolley wheels 45, 51 which border trolley hitch 31 having trolley coupling rod 39. Wheels 45, 51 are made up of double-plate roller mounts 55 having enclosed rollers. Transversely running carriers form trolley platform 13, which is clamped beneath column 19. Column 19 opens into longitudinal trolley strut 17 via longitudinal strut guide 23.

Figure 8:
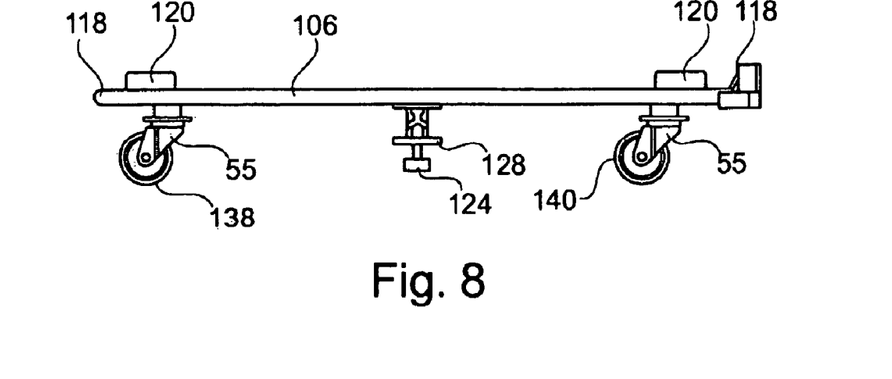

FIGS. 5 through 8 show goods carrier 100, designed as a portable pallet 102, in various perspectives, namely in a side view (FIG. 5), in a perspective view from above (FIG. 6), in a view from underneath (FIG. 7), and in another side view (FIG. 8). These figures will be described at the same time so the user may select the best illustration for the particular aspect.

Goods carrier 100 has as a central component, i.e., a pallet frame 106, on whose bottom side pallet wheels 134, 136, 138, 140 protrude, and these may include rollers 142. In the direction facing away from rollers 134, 136, 138, 140, longitudinal stops 118 and transverse stops 120 protrude out of the central plane of pallet frame 106. Pallet frame 106 forms the plane, which may be equated with the platform of the transport system. Part 154 of the locking mechanism on the goods carrier side includes a first locking spring 144, a second locking spring 146, and a spring mount 152, which separates two locking springs 144, 146 from one another at a distance. Two locking springs 144, 146 may be constructed with a first ramp 148 and a second ramp 150 having a slope, such that locking bolt 57 shown in FIG. 1 may be raised without any increased application of force while goods carrier 100 is laterally insertable. For reinforcing pallet frame 106, there is a reinforcing strut 112, which may extend as a longitudinal strut 114 as well as transverse strut 116 from one side to the next side of pallet frame 106 in the internal area of pallet frame 106. Support boards 108, 110 which hold double-plate roller mounts 55 for pallet wheels 134, 136, 138, 140 on one side and may function as a supporting surface for transport containers and transport packages on the other side are provided on the edges of pallet frame 106 on the interior side. At approximately half the distance between front pallet wheels 140, 134 and rear pallet wheels 136, 138, block brakes 126, 128 are provided on reinforcing strut 112, in particular on transverse strut 116, on the interior side of pallet frame 106. Block brakes 126, 128 each have a locking block 122, 124, the locking blocks protruding out of a block carrier 130, 132 toward the bottom. Block brakes 126, 128 may be moved into and out of the locking position by a moving linkage. Block carriers 130, 132 are designed like quadrilateral plates at the center of which sit locking blocks 122, 124.

FIGS. 9 through 13 show the goods carrier as interior cart 104 engaged with exterior cart 9, i.e., in coupling position 1. Based on the identical height of wheels 45, 134, 47, 136, the rollable moving position on floor III is shown in a manner known to those skilled in the art.

Figure 11:
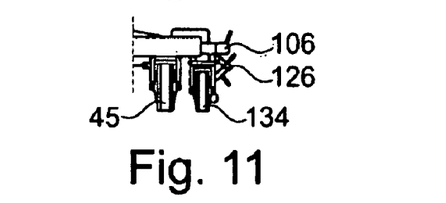
FIG. 11 shows a view of a right wheel pair of a transport system according to the present invention.

As shown particularly well in FIG. 11, pallet wheels 134 ff. of interior cart 104 protrude laterally beyond the trolley width formed from wheels 45, 47, 49, 51. The greater width of wheels 134, 136, 138, 140 in comparison with wheels 45, 47, 49, 51 ensures greater stability of interior cart 104 to be weighted with loads. Pallet frame 106 is enclosed by front part 67 and rear part 69 of the trolley. Trolley coupling rod 39 together with coupling rod eye 41 protrudes laterally toward the front out of front part 67 with first column 19. A trailer hitch trapezoidal plate 43 together with a corresponding coupling rod eye 41 protrudes out of rear part 69 of the trolley, so that two, three or more exterior carts 9 may be coupled to form a transport system having multiple carts. Trolley frame 15 together with its front column 19, rear column 21, front longitudinal strut guide 23, rear longitudinal strut guide 25 and longitudinal trolley strut 17 forms the stabilizing and limiting frame for the transport goods to be placed on the goods carrier, the transport goods being secured by stops 118, 120 against slipping off the side of frame 106. With a few means 118, 120, which are short and flat in comparison with the size of pallet frame 106, the goods held by reinforcing strut 112 such as longitudinal strut 114 or transverse strut 116 and support boards 108, 110 may be secured to prevent them from slipping down.

Figure 12:
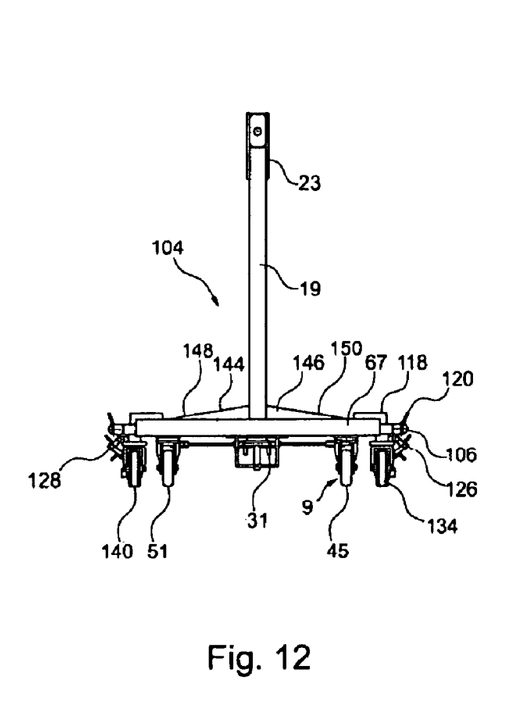
Figure 13:
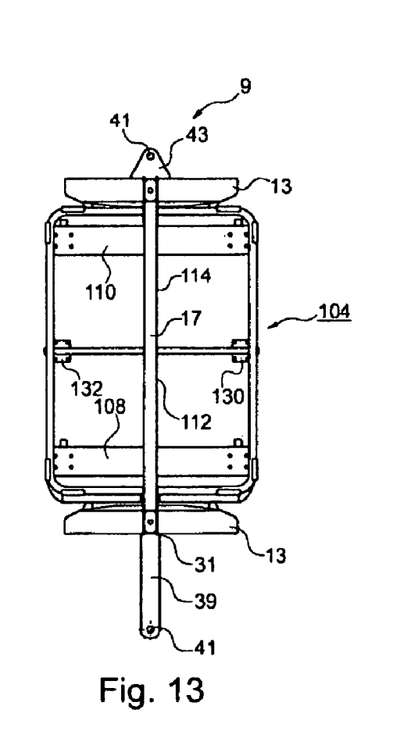
Figure 14:
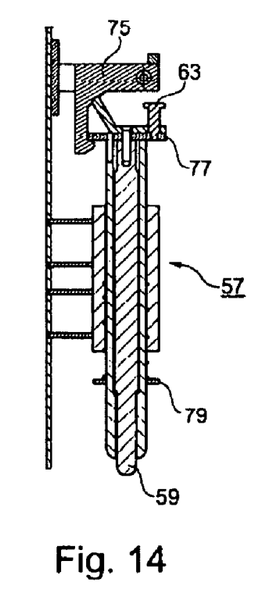
FIGS. 14 through 17 show individual aspects of a part of the locking mechanism.
Figure 15:
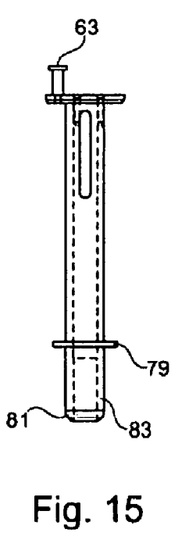
Figure 16:
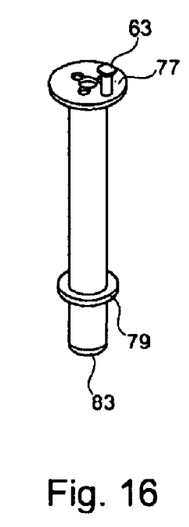

Locking blocks 122, 124, which form parts of block brakes 126, 128, are of such dimensions that in the retracted state a uniform platform 11 may be formed over exterior cart 9 and interior cart 104, uniform platform 11 coinciding with trolley platform 13 shown in FIG. 13. Locking springs 144, 146 are present on the front interior side of the trolley. The counterpart is locking bolt 57, which is shown in greater detail in FIG. 14 but has been omitted from FIGS. 9 through 13 for reasons of simplicity. Rollers 45, 47, 49, 51 and 134, 136, 138 and 140 may be rotated relative to one another in a pivoting movement. This makes it possible to bring exterior cart 9 and interior cart 104 into coupling position I by lateral shifting.

Figure 9:
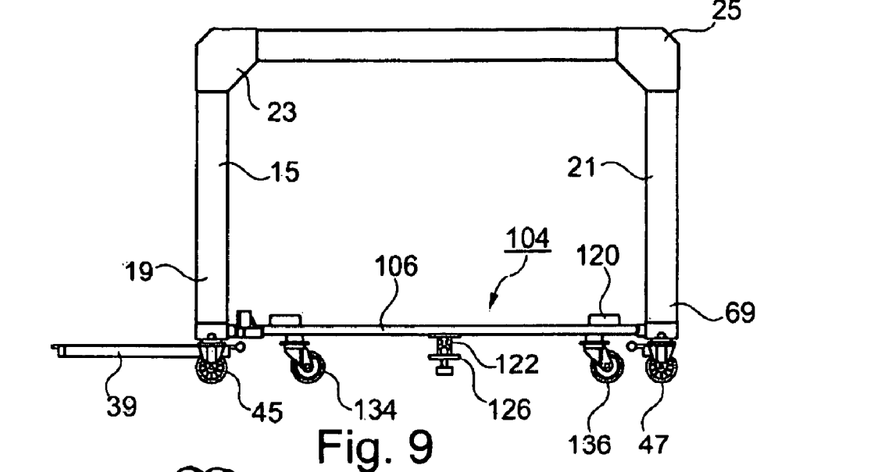
FIG. 9 shows a side view of a transport system according to the present invention.

As shown in FIGS. 12 and 13, interior cart 104 and exterior cart 9 are aligned in coupling position I. Two wheels are thus in an aligned configuration in each case, so that in the front view of FIG. 12, only wheels 45, 51 of exterior cart 9 and wheels 134, 140, which are offset outward, are visible. This configuration ensures better straight ahead movement. In exactly the same way, only front part 67 of the trolley is visible in the front view in FIG. 12, behind which first locking spring 144 and second locking spring 146 together with their ramps 148, 150 are visible. Likewise from the front, stops 118, 120 protruding out of platform 11 shown in FIG. 9 are visible. Pallet frame 106 is situated in the same plane as trolley platform 13. The moving linkages of block brakes 126, 128 also protrude laterally as outermost parts, so that block brakes 126, 128 are easily operable by a foot movement. Trolley hitch 31 connects trolley wheels 45, 51. Front column 19 is closed by first longitudinal strut guide 23.

FIG. 13 shows a top view of exterior cart 9 and interior cart 104, where it is readily apparent that longitudinal trolley strut 17 and at least one reinforcing strut 112 such as longitudinal strut 114 are spatially congruent. Transverse strut 116, which promotes torsional rigidity together with support boards 108, 110, runs at a right angle to longitudinal strut 114. Block carriers 130, 132 are situated on the edges of transverse strut 116.

Figure 9A:
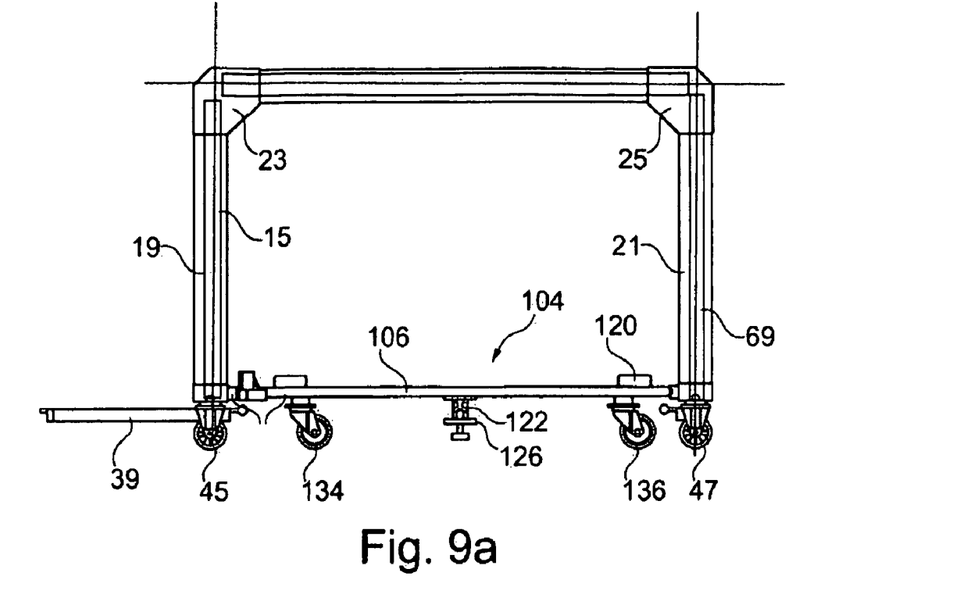
FIGS. 9a and 9b show a side view of a longitudinal section of the transport system and the trolley frame to visualize the steering gear.
Figure 9B:
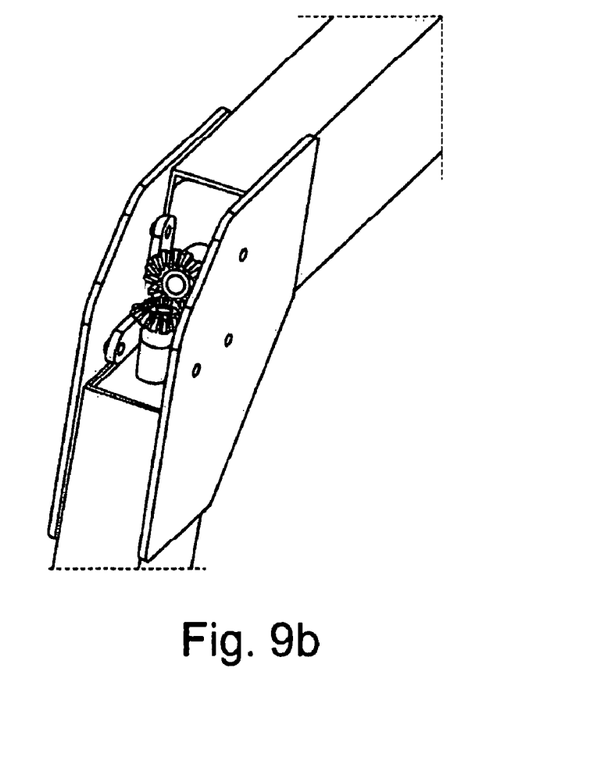
Figure 10:
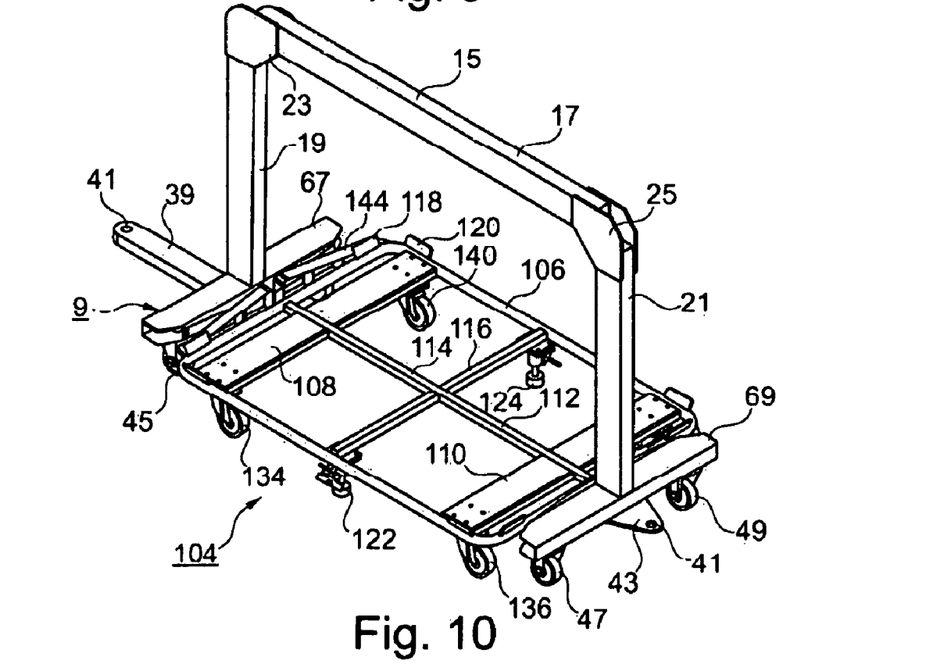
FIGS. 10, 12, 13 show a transport system according to the present invention from various views similar to the views mentioned above.

In addition, FIGS. 9a and 9b show a steering gear with which trolley wheels 45, 47, 49 and 51 of the front chassis part and the tracking rear chassis part (67 and 69) are coupled to one another in such a way that trolley wheels 45, 47, 49 and 51 turn in synchronization. This allows a tighter turning radius and uniform following of the carts in the train. The person guiding the train therefore need no longer pay attention to whether the carts are encountering obstacles on the inside of the curve, for example. In the ideal case, the carts of the train run on a shared circular path, corresponding to the curve radius predefined by the tractor.

In the present exemplary embodiment, the steering gear is formed by shafts linked together via gear wheels. Tie bars 160 and 162 of front part 167 and tie bars 164 and 168 of rear tracking part 69 are each coupled to a shaft positioned parallel to columns 19 and 21. Both shafts are connected by a shaft running parallel to trolley frame 15 and thus form the steering gear.

In the exemplary embodiment described here, the shaft of trolley frame 15 is designed to be telescoping. Together with longitudinally adjustable trolley frame 15, the length of the cart may be varied for adjustment to goods carriers of different lengths. Instead of longitudinally adjustable trolley frames 15, trolley frames 15 of suitable lengths may also be used.

Ratchet pin 59 shown in FIGS. 14 through 16 and 20 through 22 as part of locking bolt 57 is a self-releasing ratchet pin 59, which may be held in the unlocked position via a ratchet pin pawl 75. If locking bolt 57 is retracted into the socket formed at the location derived from spring holder 152 as shown in the figures described above, the locking bolt may be manually unlocked via lift pin 63, which sits in ratchet pin plate 77. Ratchet pin 59 is inserted in bolt eye 61. Bolt eye 61 is attached to front column 19. A second ratchet pin plate 79 is situated near ratchet pin tip 81, which functions as a contact point for a spiral spring. The spiral spring facilitates automatic lowering of locking bolt 57. Ratchet pin 59 is constructed in two parts having an outer shell 83.

FIGS. 20 through 25 show the function principle of the coupling or locking mechanism 65, 154 for detachable joining of goods carrier 100 to trolley 5. Such a locking mechanism 65, 154 is provided on trolley 5 on the side of front and rear chassis parts 67 and 69, and cooperates with the corresponding locking part on goods carrier 100.

Figure 21:
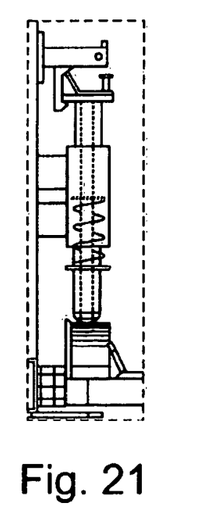
Figure 22:
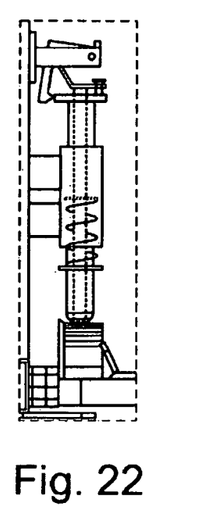
Figure 23:
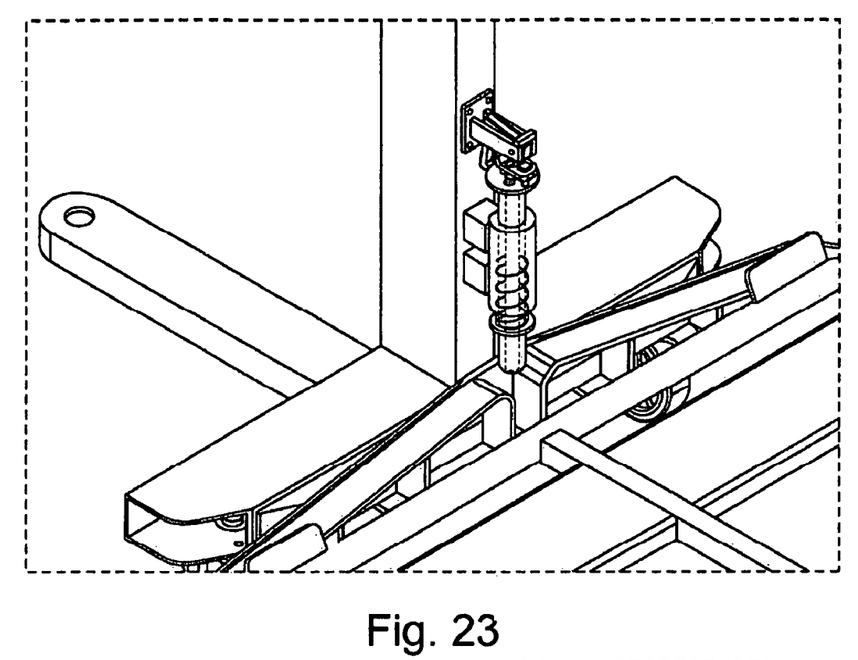
FIGS. 23 to 25 each show a perspective view of the locking mechanism in three positions.
Figure 24:
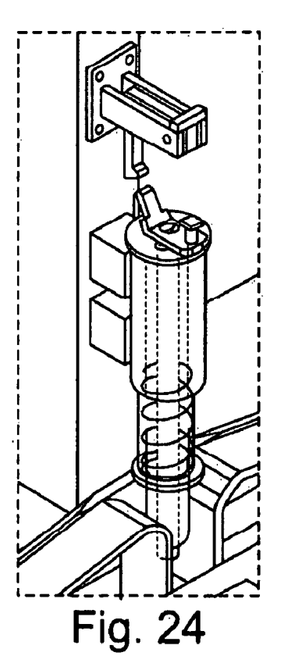
Figure 25:
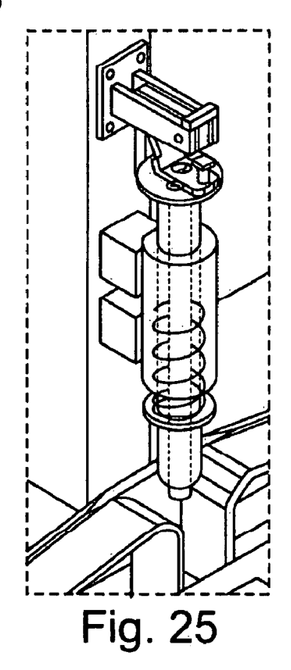

Locking bolt 57, which locks the cart, is raised by a cable pull. This bolt engages in a ratchet, and goods carrier 100 may be removed (basic position according to FIG. 23). By retracting goods carrier 100, coaxial ratchet pin 59 situated on the inside is pushed passed a ramp of goods carrier 100 on the bottom side and thereby raised as illustrated in FIGS. 21 and 22. Ratchet pin 59 cooperates at the head end with a ratchet which releases ratchet pin 59 when raised together with locking bolt 57. Locking bolt 57 therefore drops between the ramps of goods carrier 100 and locks it (FIG. 24).

Figure 17:
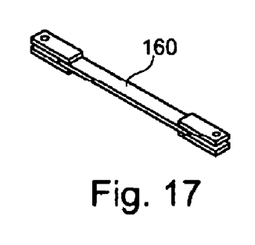

FIG. 17 shows the elongated flat extended single-layer plate spring, which is one of holding springs 160.

For use in a plant, i.e., during operations, interior cart 104, which may also be referred to as portable pallet 102, may be loaded in a stationary position, raised from the floor by block brakes 126, 128. If interior cart 104 is to be transported away with the help of exterior cart 9, block brakes 126, 128 must be released. The interior cart is first raised by one of ramps 148, 150 of locking springs 144, 146 during lateral insertion into trolley 5 through one of insertion openings 27, 29, and then drops into spring holder 152 together with locking bolt 57, thus forming a fixed connection between exterior cart 9 and interior cart 104. Trolley 5 is easily adapted to different sizes of a portable pallet due to the telescoping property of trolley frame 15. This creates a flexible but nevertheless reliable transport system, which may be lengthened as needed and may be used for in-plant goods transport in buildings without ground rails.

Figure 18:
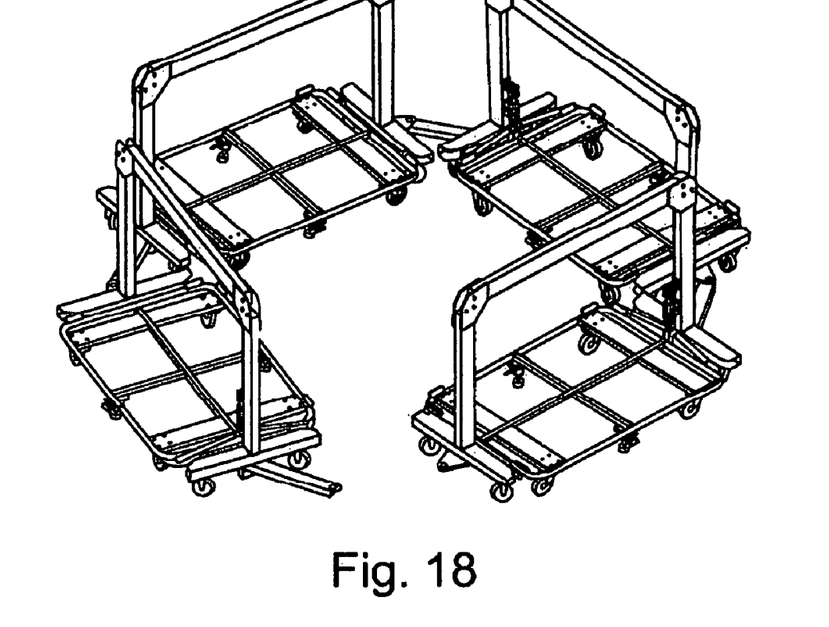
FIG. 18 shows a perspective view of a train having four carts.

FIG. 18 shows a train in which four carts 9 are coupled to one another by a particular trolley coupling rod 39. This train may in turn be coupled to a tractor via free trolley coupling rod 39.

Figure 19:
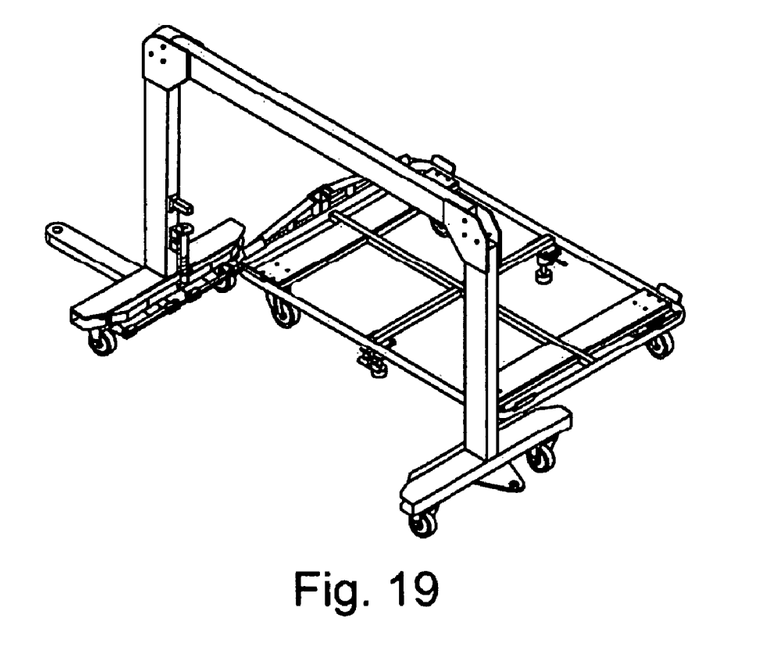
FIG. 19 shows a perspective view of a cart having a goods carrier being inserted.
Figure 20:
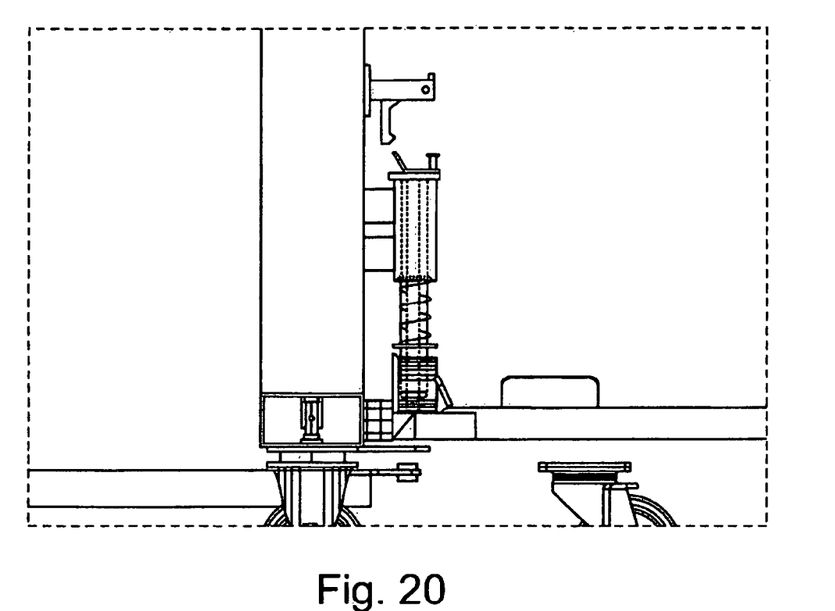
FIGS. 20 through 22 each show a side view of the locking mechanism in three positions.

FIG. 19 shows a cart having a goods carrier being inserted. Goods carrier guides 33 and 35 are preferably designed in such a way that the goods carrier is insertable from both sides of the cart. This facilitates universal loadability of the transport system.

To make goods carrier 100 mobile, the chassis of goods carrier 100 is equipped with steering rollers and/or block rollers 134, 136, 138, 140. The steering rollers are vertically pivotable and make goods carrier 100 maneuverable. A fork (steering fork) is connected to the fastening element via a swiveling bearing (slewing ring). The fastening element is fixedly mounted on the chassis. The fork therefore remains pivotable. To be able to easily pivot the fork, the wheel is usually mounted at a horizontal distance (working range) between the axes of the swiveling bearing and the wheel. Due to the working range, easy pivoting of the roller is possible without any additional aids, thus ensuring stable running behavior when traveling straight ahead.

Figure 26:
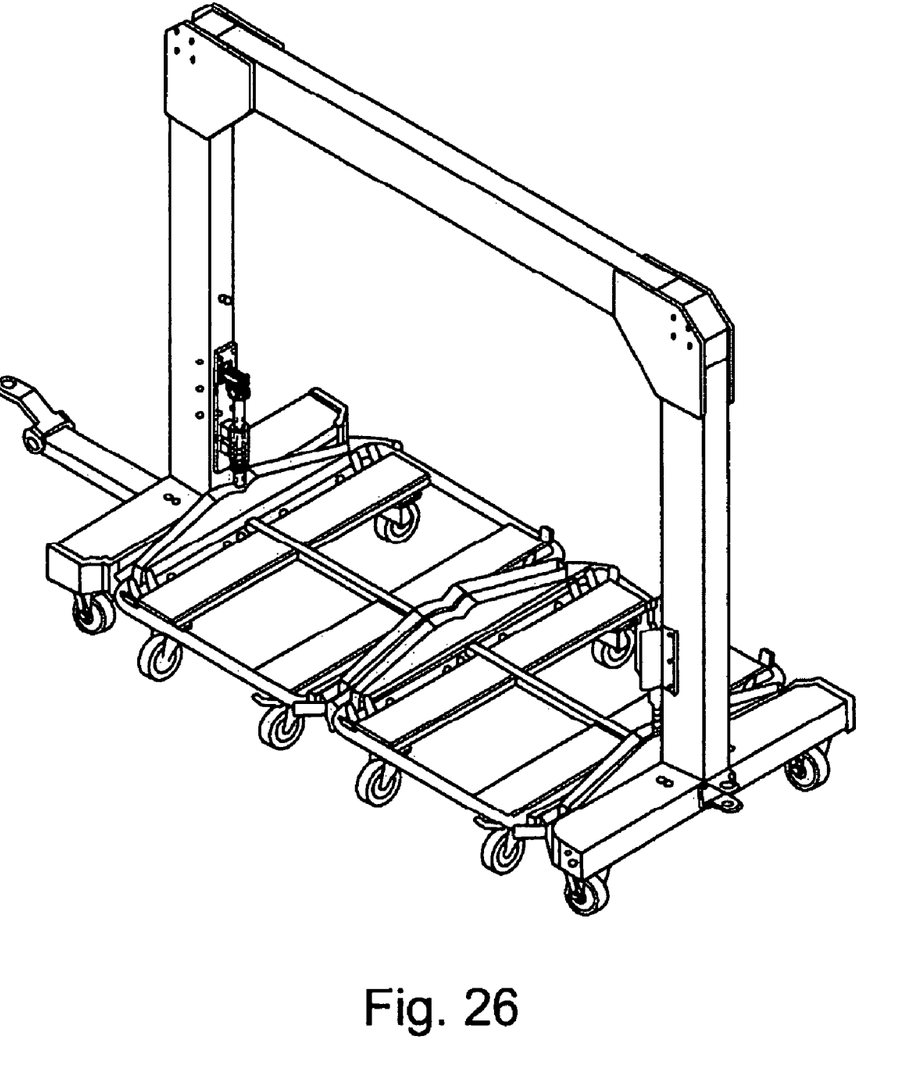
FIG. 26 shows a perspective view of a transport system which is equipped with two goods carriers.

FIG. 26 shows a transport system having two goods carriers 100. The goods carriers are of equal length in the present case and are matched in length so that they fit into the area spanned between chassis parts 67, 69. The trolley may of course be adapted to different lengths of goods carrier 100 due to the longitudinal adjustability of trolley frame 15. With respect to the direction of travel, both goods carriers 100 are situated to follow.

For automatic locking with trolley 5, goods carriers 100 are each provided with a ramp 148, 150, which cooperates with locking mechanism 56 for bringing goods carrier 100 into a coupling position. Ramps 148, 150 are designed to be laterally symmetrical, so that goods carrier 100 may be pulled in from both sides of trolley 5.

Although essentially only one exemplary embodiment has been presented, those skilled in the art will naturally understand that embodiments having more than just one receiving opening in the exterior cart would be included within the scope of protection of the present invention. A specific embodiment according to the present invention having more than four wheels on each cart is also possible.

LIST OF REFERENCE NUMERALS

| Reference numeral | Object |
|---|---|
| 1 | Transport device or transport system |
| 3 | Train cart |
| 5 | Trolley |
| 7 | Chassis |
| 9 | Exterior cart |
| 11 | Platform |
| 13 | Trolley platform |
| 15 | Trolley frame |
| 17 | Longitudinal trolley strut |
| 19 | First column |
| 21 | Second column |
| 23 | First longitudinal strut guide |
| 25 | Second longitudinal strut guide |
| 27 | First lateral insertion opening |
| 29 | Second lateral insertion opening |
| 31 | Trolley hitch |
| 33 | Goods carrier guide |
| 35 | Goods carrier guide |
| 37 | Goods carrier insertion bracket, in particular for facilitated lateral centering and for facilitated lateral alignment of the goods carrier relative to the trolley |
| 39 | Trolley coupling rod |
| 41 | Coupling rod eye |
| 43 | Trailer hitch trapezoidal plate |
| 45 | First trolley wheel |
| 47 | Second trolley wheel |
| 49 | Third trolley wheel |
| 51 | Fourth trolley wheel |
| 53 | Roller, in particular solid rubber roller |
| 55 | Double-plate roller mount, in particular rotatable and/or pivotable |
| 57 | Locking bolt |
| 59 | Ratchet pin |
| 61 | Bolt eye |
| 63 | Lift pin |
| 65 | Part of the locking mechanism, trolley side |
| 67 | Front part of trolley |
| 69 | Rear part of trolley |
| 71 | Distance between front and rear parts of trolley |
| 73 | Trolley frame height |
| 75 | Ratchet pin pawl, in particular a self-releasing pawl |
| 77 | Ratchet pin plate |
| 79 | Ratchet pin plate |
| 81 | Ratchet pin tip |
| 83 | Outer shell |
| 100 | Goods carrier |
| 102 | Pallet |
| 104 | Interior cart |
| 106 | Pallet frame |
| 108 | First support board preferably made of metal |
| 110 | Second support board preferably made of metal |
| 112 | Reinforcing strut |
| 114 | Longitudinal strut |

-continued

| Reference numeral | Object |
| --- | --- |
| 116 | Transverse strut |
| 118 | Longitudinal stop |
| 120 | Transverse stop |
| 122 | First locking block |
| 124 | Second locking block |
| 126 | First block brake |
| 128 | Second block brake |
| 130 | First block carrier |
| 132 | Second block carrier |
| 134 | First pallet wheel |
| 136 | Second pallet wheel |
| 138 | Third pallet wheel |
| 140 | Fourth pallet wheel |
| 142 | Roller, in particular solid rubber roller |
| 144 | First locking spring |
| 146 | Second locking spring |
| 148 | First ramp of locking spring |
| 150 | Second ramp of locking spring |
| 152 | Spring holder |
| 154 | Part of the locking mechanism, goods carrier side |
| 160 | First holding spring |
| 162 | Second holding spring |
| 164 | Third holding spring |
| 166 | Fourth holding spring |
| 168 | Spring retainer, in particular flange type |
| I | Coupling position |
| II | Uncoupled position |
| III | Floor on which the carts may roll |

What is claimed is:

1. A transport system comprising:
   a trolley; and
   at least one goods carrier detachably connected to the trolley by a coupling, the trolley and the goods carrier each being provided with a chassis having wheels for movement on a roadway in the coupled and uncoupled position,
   the chassis of the trolley including a front and a rear chassis part provided with at least some of the wheels,
   the front and rear chassis parts being connected via a trolley frame in such a way that the goods carrier is insertable in an opening between the front and rear chassis parts on both sides,
   wherein the trolley is provided on the side of the front and rear chassis parts with a locking mechanism for detachably locking the goods carrier to the trolley,
   and wherein the goods carrier is provided with at least one ramp or connecting link, which cooperates with the locking mechanism for automatically locking with the trolley after the goods carrier is moved into a coupling position.

2. The transport system as recited in claim 1 wherein the wheels of the front and/or rear chassis parts are steerable.

3. The transport system as recited in claim 1 wherein the wheels of the front and rear chassis parts are coupled together for synchronous steering.

4. The transport system as recited in claim 1 wherein the front or rear chassis part is provided with a trolley hitch for towing by hand and/or by tractor.

5. The transport system as recited in claim 1 wherein the trolley frame is longitudinally adjustable for longitudinal adjustability of the trolley.

6. The transport system as recited in claim 1 wherein the front and rear chassis parts are each provided with a goods carrier guide, the goods carrier guides being situated on facing sides of the front and rear chassis parts.

7. The transport system as recited in claim 1 wherein locking mechanisms are releasable by a cable pull.

8. The transport system as recited in claim 1 wherein the goods carrier has an essentially rectangular horizontal projection.

9. The transport system as recited in claim 1 wherein the goods carrier has a tension rod pivotable between a resting position and a working position.

10. The transport system as recited in claim 1 wherein the trolley is able to be equipped with two of the at least one goods carrier, the length of the goods carriers being selected so the two goods carriers are adjustable to follow one another between the front and rear chassis parts.

11. The transport system as recited in claim 1 further comprising a locking bolt in the form of a ratchet pin situated on an interior side of the trolley and, released by at least one locking spring, the locking bolt automatically falling into a locking recess such as a spring holder when the goods carrier has been brought into a coupling position.

12. The transport system as recited in claim 1 wherein the wheels of the goods carrier are to be rotated relative to the wheels of the trolley so that the goods carrier may be laterally inserted between a front part and a rear part of the trolley.

13. The transport system as recited in claim 1 wherein the goods carrier is designed as a portable pallet, mechanically stabilized by at least one reinforcing strut, on which the usual commercial transport containers such as mesh boxes, containers, or standard pallets are mechanically permanently mountable.

14. A transport system comprising:
    a trolley; and
    at least one goods carrier detachably connected to the trolley by a coupling, the trolley and the goods carrier each being provided with a chassis having wheels for movement on a roadway in the coupled and uncoupled position,
    the chassis of the trolley including a front and a rear chassis part provided with at least some of the wheels,
    the front and rear chassis parts being connected via a trolley frame in such a way that the goods carrier is insertable in an opening between the front and rear chassis parts on both sides, wherein the goods carrier is able to be positioned by at least one locking block, detachable by a laterally activatable block brake, so that it is raised from the floor, the goods carrier being movable out of the coupling position by the upright movement.

15. A transport system comprising a first cart which is in particular a tow cart forming a train cart, and a second cart which is in particular a cart for goods transport, both being equipped with rollers for movement adhering to the floor, wherein the first cart borders the second cart on at least one side, preferably on two sides which are joined together by a frame in particular, and a first cart has a locking mechanism for coupling with a locking mechanism of the second cart, the two locking mechanisms in particular automatically coupling the two carts together when the second cart is situated in a coupling position relative to the first cart.

* * * * *